(12) United States Patent
Kobayashi

(10) Patent No.: US 12,384,236 B2
(45) Date of Patent: Aug. 12, 2025

(54) HYBRID VEHICLE CONTROL APPARATUS

(71) Applicant: SUBARU CORPORATION, Tokyo (JP)

(72) Inventor: Tokito Kobayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/251,349

(22) PCT Filed: Dec. 21, 2021

(86) PCT No.: PCT/JP2021/047160
§ 371 (c)(1),
(2) Date: May 1, 2023

(87) PCT Pub. No.: WO2023/119390
PCT Pub. Date: Jun. 29, 2023

(65) Prior Publication Data
US 2024/0343105 A1    Oct. 17, 2024

(51) Int. Cl.
*B60K 6/38* (2007.10)
*B60K 6/24* (2007.10)
*B60K 6/26* (2007.10)
*B60W 20/40* (2016.01)

(52) U.S. Cl.
CPC .............. *B60K 6/24* (2013.01); *B60K 6/26* (2013.01); *B60K 6/38* (2013.01); *B60W 20/40* (2013.01)

(58) Field of Classification Search
CPC .. B60K 6/24; B60K 6/26; B60K 6/38; B60W 10/02; B60W 10/06; B60W 10/08; B60W 20/10; B60W 20/15; B60W 20/40
See application file for complete search history.

(56) References Cited

U.S. PATENT DOCUMENTS

| | | | | |
|---|---|---|---|---|
| 10,836,246 | B1* | 11/2020 | Park | B60K 6/36 |
| 2007/0187160 | A1* | 8/2007 | Raoul | B60K 6/547 |
| | | | | 180/65.21 |
| 2012/0061198 | A1 | 3/2012 | Asatsuke et al. | |
| 2020/0307370 | A1* | 10/2020 | Nabeshima | B60K 6/448 |
| 2021/0023931 | A1* | 1/2021 | Hwang | F16H 3/085 |
| 2021/0070171 | A1 | 3/2021 | Oki | |

FOREIGN PATENT DOCUMENTS

| | | |
|---|---|---|
| JP | 2003-284206 A | 10/2003 |
| JP | 2010-203591 A | 9/2010 |
| JP | 2021-41798 A | 3/2021 |

* cited by examiner

*Primary Examiner* — Edwin A Young
(74) *Attorney, Agent, or Firm* — Rimon P.C.

(57) ABSTRACT

A hybrid vehicle control apparatus includes a controller. The controller is configured to switch an operation mode of a hybrid vehicle between a vehicle-stopped electric power generation mode, a first reverse traveling mode, and a second reverse traveling mode. The vehicle-stopped electric power generation mode is a mode in which electric power generation is performed, while the hybrid vehicle is stopped, by sending power of an engine to an electric motor. The first reverse traveling mode is a mode in which the reverse traveling is performed by the power of the engine. The second reverse traveling mode is a mode in which the reverse traveling is performed by power of the electric motor. The controller is configured to switch the operation mode to the second reverse traveling mode when switching from the vehicle-stopped electric power generation mode to the reverse traveling is requested.

12 Claims, 6 Drawing Sheets

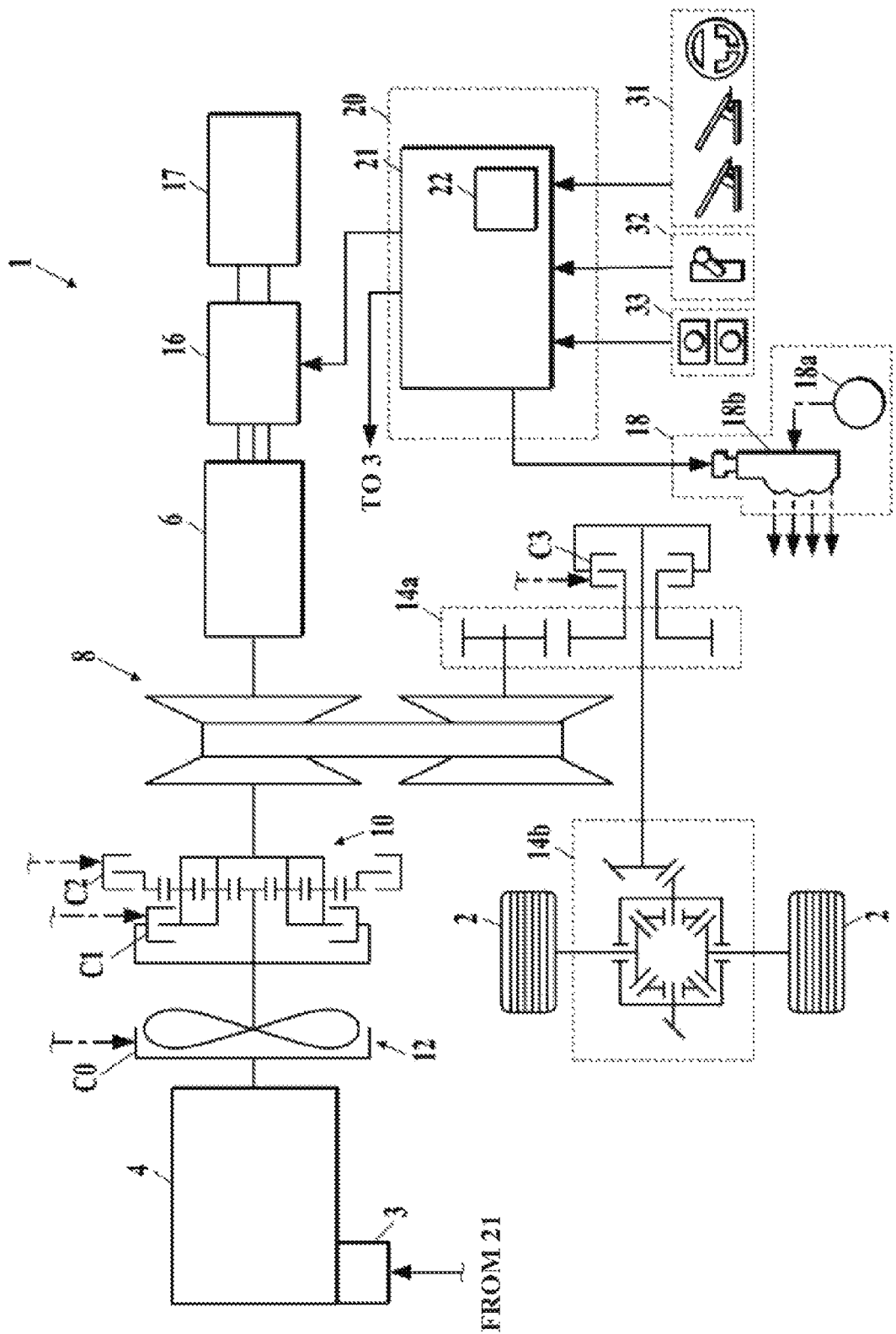
[FIG. 1]

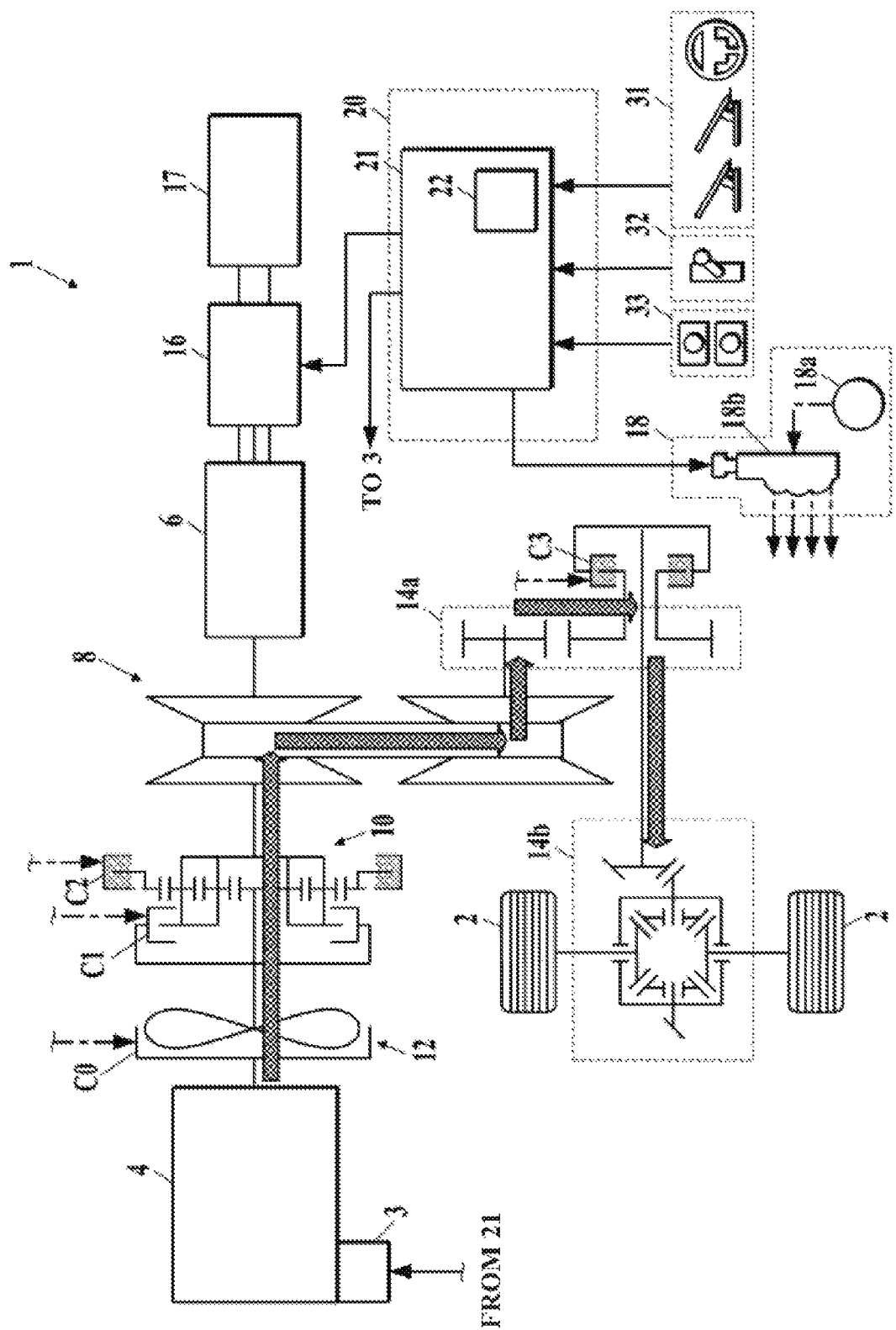
[FIG. 2]

[FIG. 3]
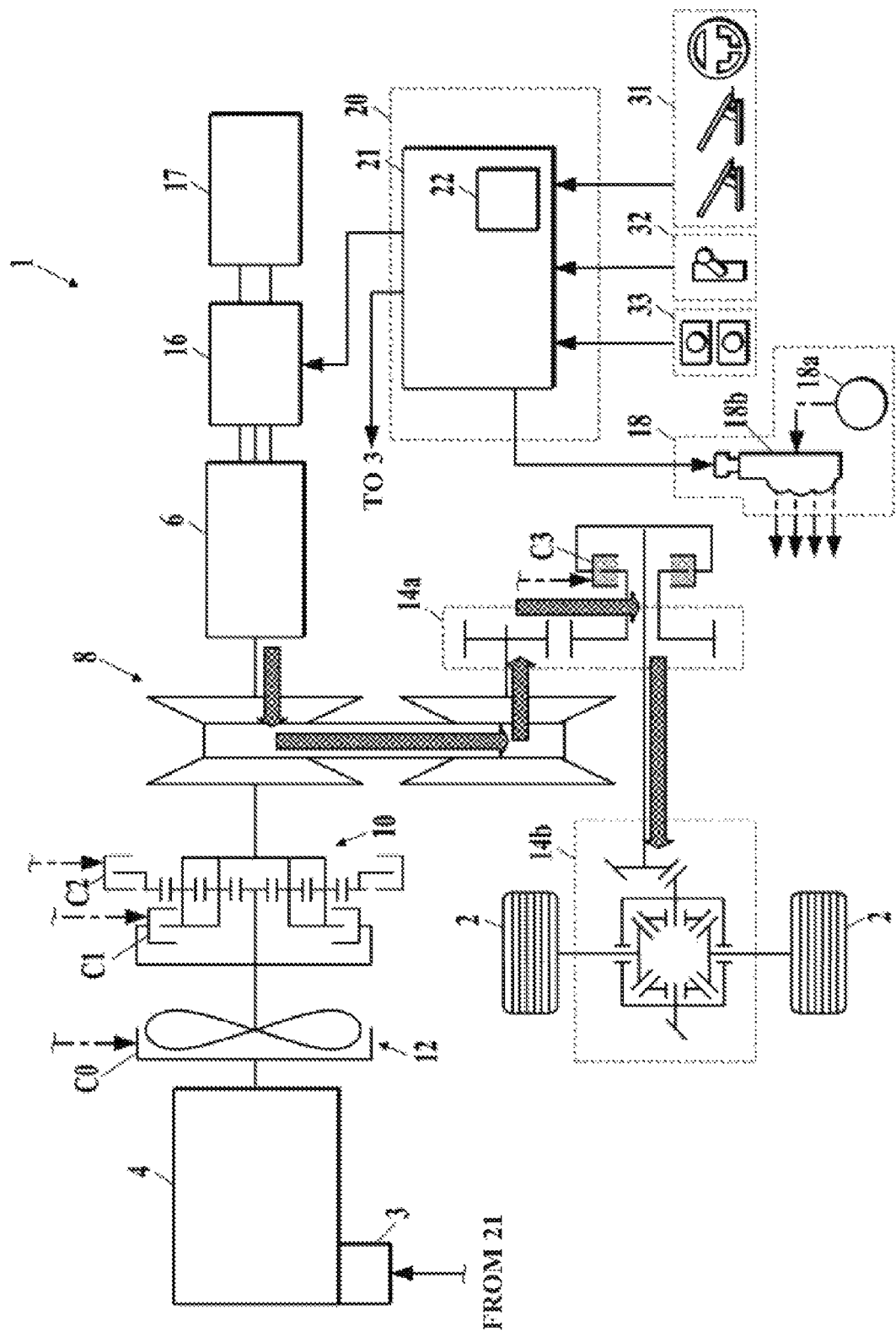

[FIG. 4]
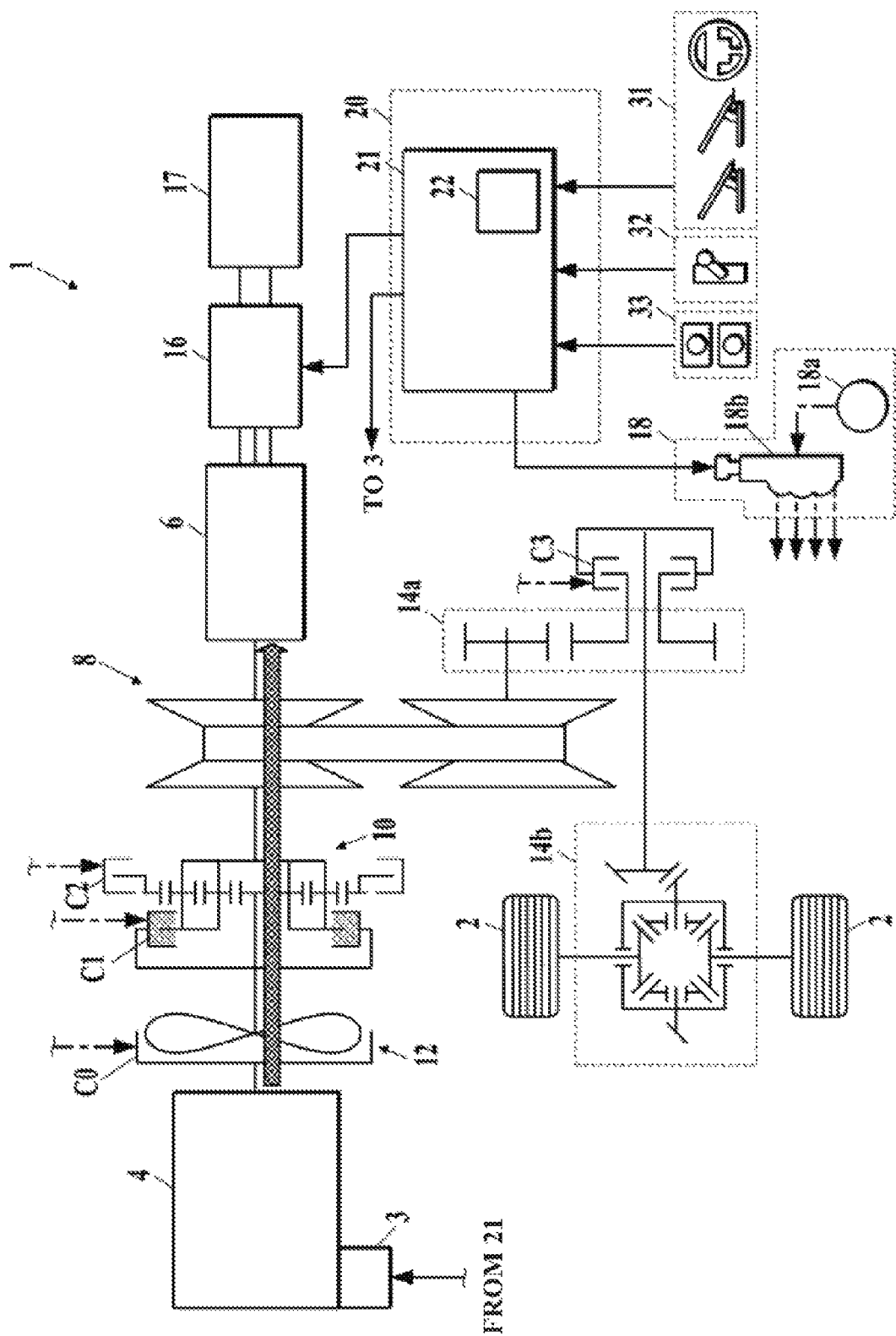

[FIG. 5]
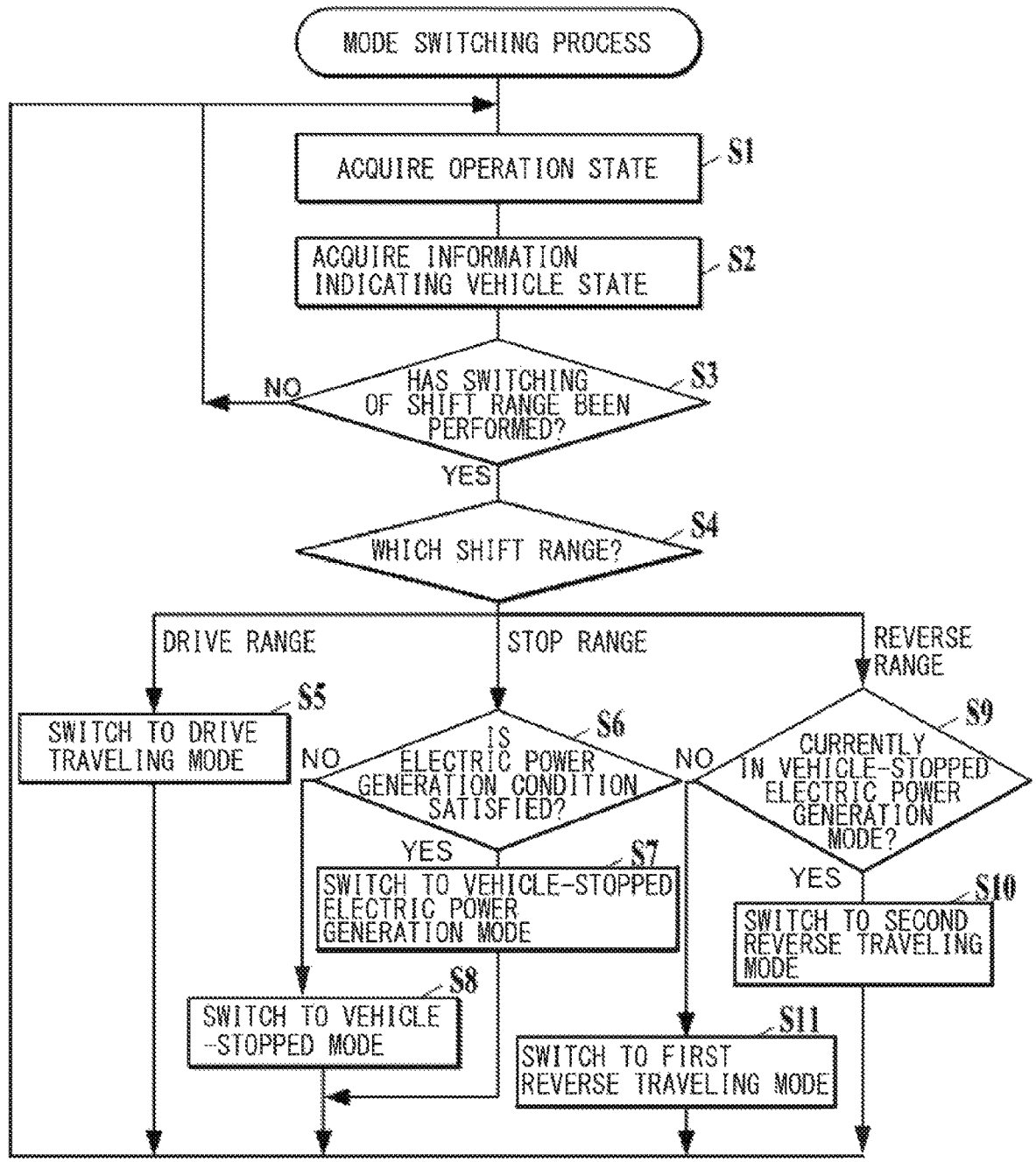

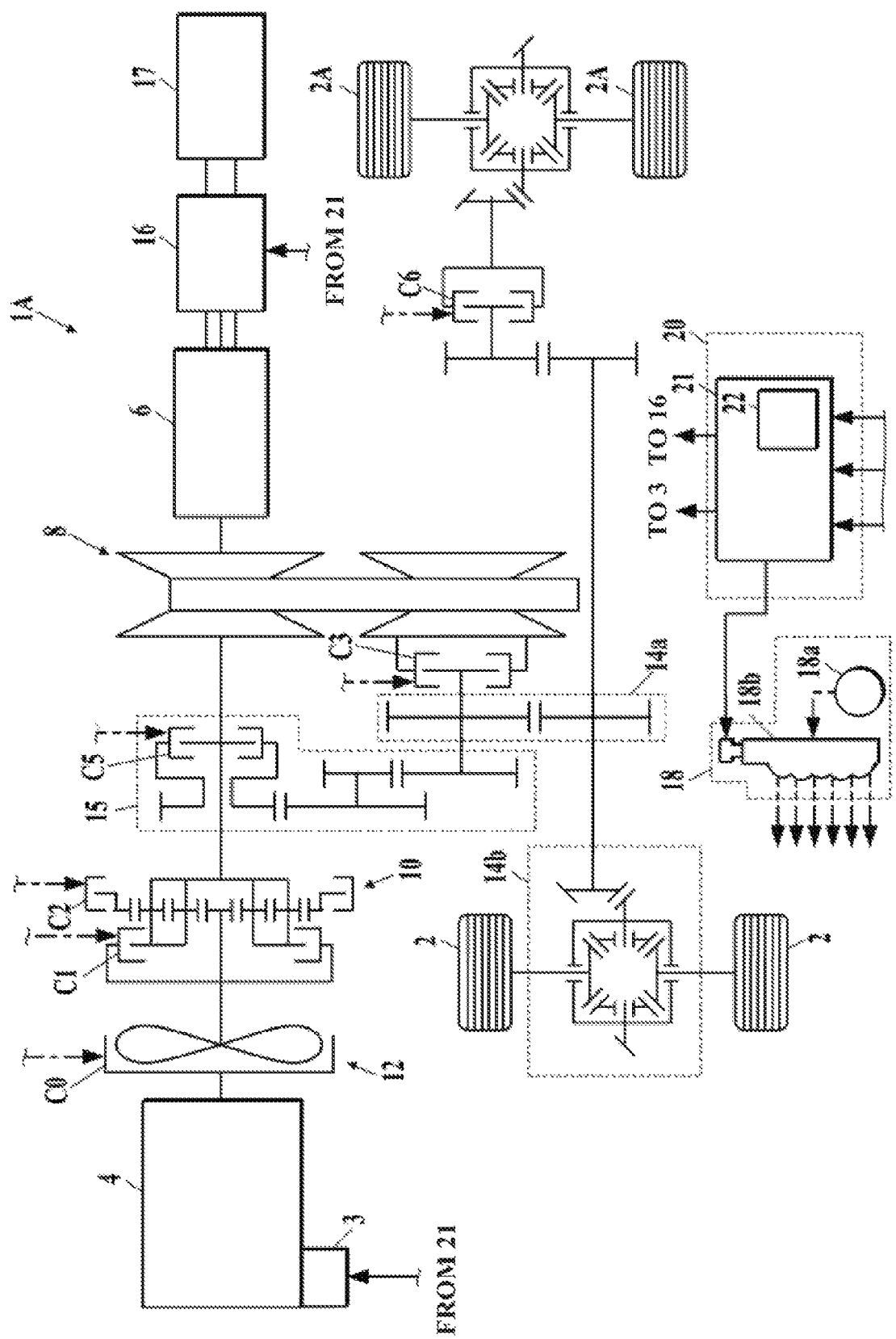
[FIG. 6]

HYBRID VEHICLE CONTROL APPARATUS

CROSS-REFERENCE TO RELATED APPLICATIONS

This application is the U.S. National Phase under 35 U.S.C. § 371 of International Application No. PCT/JP2021/047160, filed on Dec. 21, 2021.

TECHNICAL FIELD

The invention relates to a hybrid vehicle control apparatus.

BACKGROUND ART

Patent Literature 1 discloses a hybrid vehicle that is able to cause an electric motor to perform electric power generation by power of an engine while the vehicle is stopped.

CITATION LIST

Patent Literature

Patent Literature 1: Japanese Unexamined Patent Application Publication No. 2003-284206

SUMMARY

Problem to be Solved by the Invention

Regarding a hybrid vehicle, there is an electric motor arrangement that is called a P2 arrangement. The P2 arrangement refers to an arrangement in which a transmission is positioned on a power transmission path between an electric motor and a driving wheel and a power transmission path between the electric motor and an engine is able to be cut off by a clutch. A hybrid vehicle adopting the P2 arrangement has had a problem that, upon performing switching from a vehicle-stopped electric power generation mode in which electric power generation is performed by power of the engine while the hybrid vehicle is stopped to an operation mode in which reverse traveling is performed by the power of the engine, it takes a long time to switch respective states of clutches.

It is desirable to provide a hybrid vehicle control apparatus that allows for swift switching from a vehicle-stopped electric power generation mode to reverse traveling.

Means for Solving the Problem

A hybrid vehicle control apparatus according to an aspect of the invention is a control apparatus to be mounted on a hybrid vehicle. The hybrid vehicle includes a driving wheel, an engine, an electric motor, a transmission, and a clutch. The engine is an internal combustion engine. The electric motor generates power to be outputted to the driving wheel. The transmission is positioned on a power transmission path between the electric motor and the driving wheel. The clutch is configured to cut off the power transmission path between the engine and the electric motor. The hybrid vehicle control apparatus is characterized by including a controller. The controller is configured to switch an operation mode of the hybrid vehicle between a vehicle-stopped electric power generation mode, a first reverse traveling mode, and a second reverse traveling mode. The vehicle-stopped electric power generation mode is a mode in which electric power generation is performed, while the hybrid vehicle is stopped, by sending power of the engine to the electric motor. The first reverse traveling mode is a mode in which reverse traveling is performed by the power of the engine. The second reverse traveling mode is a mode in which the reverse traveling is performed by power of the electric motor. The controller is configured to switches the operation mode to the second reverse traveling mode when switching from the vehicle-stopped electric power generation mode to the reverse traveling is requested.

Effects of the Invention

According to the aspect of the invention, in a case where switching from a vehicle-stopped electric power generation mode to reverse traveling is requested, switching to a second reverse traveling mode is performed. The second reverse traveling mode is a mode in which the reverse traveling is performed by power of an electric motor. It takes less time to switch respective states of clutches in such switching as compared with switching to a first reverse traveling mode. The first traveling mode is a mode in which the reverse traveling is performed by power of an engine. This allows for swift switching from the vehicle-stopped electric power generation mode to the reverse traveling.

BRIEF DESCRIPTION OF DRAWINGS

FIG. 1 is a block diagram illustrating a hybrid vehicle and a control apparatus according to Embodiment 1 of the invention.

FIG. 2 is a diagram describing respective states of clutches in a first reverse traveling mode.

FIG. 3 is a diagram describing the respective states of the clutches in a second reverse traveling mode.

FIG. 4 is a diagram describing the respective states of the clutches in a vehicle-stopped electric power generation mode.

FIG. 5 is a flowchart illustrating a mode switching process to be executed by a controller.

FIG. 6 is a block diagram illustrating a hybrid vehicle and a control apparatus according to Embodiment 2 of the invention.

MODES FOR CARRYING OUT THE INVENTION

In the following, some embodiments of the invention are described in detail with reference to the drawings. Herein, a state in which a clutch transmits power is referred to as an engaged state of the clutch, and a state in which a clutch does not transmit power is referred to as a disengaged state of the clutch.

Embodiment 1

FIG. 1 is a block diagram illustrating a hybrid vehicle and a control apparatus according to Embodiment 1 of the invention. A hybrid vehicle 1 according to Embodiment 1 includes driving wheels 2, an engine 4, accessories 3, an electric motor 6, and an inverter 16. The engine 4 is an internal combustion engine. The accessories 3 are configured to drive the engine 4. The electric motor 6 generates power to be outputted to the driving wheels 2. The inverter 16 drives the electric motor 6. The hybrid vehicle 1 further includes a battery 17 and a transmission 8. The battery 17 accumulates power-running electric power and regenerative electric power of the electric motor 6. The transmission 8 is positioned on a power transmission path between the electric motor 6 and the driving wheels 2. The hybrid vehicle 1 further includes a reverse gear mechanism 10, a forward clutch C1, and a reverse clutch C2. The reverse gear mechanism 10 is configured to reverse power of the engine 4. The forward clutch C1 transmits the power of the engine 4 to a later stage in forward rotation as it is. The reverse clutch C2 transmits the power of the engine 4 by means of a reverse rotation act of the reverse gear mechanism 10. The hybrid vehicle 1 further includes an output clutch C3. The output clutch C3 is configured to cut off transmission of power to the driving wheels 2 independently of respective operations of the engine 4 and the electric motor 6. The hybrid vehicle 1 may further include a torque converter 12, a latch-up clutch C0, and one or more gear mechanisms 14a and 14b. The torque converter 12 and the latch-up clutch C0 may be provided between the engine 4 and the reverse gear mechanism 10. The one or more gear mechanisms 14a and 14b may be positioned on the power transmission path. The gear mechanism 14b may include a differential gear.

The transmission 8 is a CVT (Continuously Variable Transmission). The transmission 8 may be a transmission of any other type, such as a stepped transmission.

On a power transmission path from the engine 4 to the driving wheels 2, the torque converter 12 in combination with the latch-up clutch C0, the reverse gear mechanism 10 in combination with the forward clutch C1 and the reverse clutch C2, the transmission 8, the gear mechanism 14a, the output clutch C3, and the gear mechanism 14b are positioned in this order.

On a power transmission path from the electric motor 6 to the driving wheels 2, the transmission 8, the gear mechanism 14a, the output clutch C3, and the gear mechanism 14b are positioned in this order.

On a power transmission path from the engine 4 to the electric motor 6, the torque converter 12 in combination with the latch-up clutch C0, and the reverse gear mechanism 10 in combination with the forward clutch C1 and the reverse clutch C2 are positioned in this order. The forward clutch C1 and the reverse clutch C2 also serve as clutches that are able to cut off the power transmission path between the engine 4 and the electric motor 6. That is, both the forward clutch C1 and the reverse clutch C2 being in the disengaged state causes a state in which power is not transmitted from the engine 4 to the electric motor 6.

The hybrid vehicle 1 further includes a clutch switching device 18. The clutch switching device 18 switches respective states of the clutches. The clutch switching device 18 may include a hydraulic pressure pump 18a and a control valve 18b, and may be configured to perform switching related to the clutches with use of hydraulic pressure. The hydraulic pressure pump 18a generates the hydraulic pressure. The control valve 18b sends the hydraulic pressure to a clutch to be controlled. In FIGS. 1 to 4, the hydraulic pressure is indicated by an arrow of a dash-dot-dash line. The clutch to be controlled by the clutch switching device 18 includes at least the forward clutch C1, the reverse clutch C2, and the output clutch C3. The clutch to be controlled may further include the latch-up clutch C0.

Upon performing switching from the disengaged state to the engaged state of the clutch, a movable member of the clutch is to be moved in a hydraulic pressure direction, which consumes energy. Meanwhile, the workload of the hydraulic pressure pump 18a is limited. Accordingly, the number of clutches to be subjected to the switching from the disengaged state to the engaged state at a time is limited. In Embodiment 1, the performance of the hydraulic pressure pump 18a is set in such a manner that the number of clutches to be subjected to the switching from the disengaged state to the engaged state at a time is one. Such a setting allows for a reduction in size of the hydraulic pressure pump 18a. Because of such a setting, in a case of subjecting two or more of the forward clutch C1, the reverse clutch C2, and the output clutch C3 to the switching from the disengaged state to the engaged state, switching processes for the respective clutches are performed sequentially at different timings.

In contrast, upon performing switching from the engaged state to the disengaged state of the clutch, the movable member of the clutch is to move in a direction opposite to the hydraulic pressure direction, which consumes less energy. It is therefore possible to subject multiple clutches to the switching from the engaged state to the disengaged state at a time regardless of the workload of the hydraulic pressure pump 18a. In addition, the process of subjecting one clutch to the switching from the disengaged state to the engaged state and the process of subjecting one or more clutches to the switching from the engaged state to the disengaged state are able to be performed in parallel.

Note that the clutch switching device 18 may be configured to switch the state of the clutch by electric power. In this case also, a situation similar to the above-described situation occurs in a case where the performance (the maximum output) of the clutch switching device 18 is less than electric power necessary for subjecting multiple clutches to the switching from the disengaged state to the engaged state at the same time.

The hybrid vehicle 1 further includes a driving operation unit 31, a shift operation unit 32, and an operation unit 33. The driving operation unit 31 receives a driving operation. The shift operation unit 32 allows for selection of a shift range. The operation unit 33 allows for switching of various functions. For example, the shift range includes a drive range for forward traveling, a reverse range for reverse traveling, and a stop range for causing a vehicle to be stopped continuously (for example, a parking range). The hybrid vehicle 1 further includes a control apparatus 20. The control apparatus 20 switches an operation mode of the hybrid vehicle 1 on the basis of the selected shift range and a vehicle state.

The control apparatus 20 includes a controller 21. The controller 21 has a configuration that includes one ECU (Electronic Control Unit) or multiple ECUs that operate in association by performing mutual communication. The controller 21 receives an operation signal of the driving operation unit 31, an operation signal of the shift operation unit 32, and information indicating the vehicle state (such as a vehicle speed or a charged state of the battery 17). The controller 21 controls driving of the engine 4 via the accessories 3, and controls driving of the electric motor 6 via the inverter 16. In addition, the controller 21 is able to switch the respective states of the clutches (C0 to C3) by controlling the control valve 18b of the clutch switching device 18.

<Operation Modes of Hybrid Vehicle>

FIG. 2 is a diagram describing the respective states of the clutches in a first reverse traveling mode. FIG. 3 is a diagram describing the respective states of the clutches in a second reverse traveling mode. FIG. 4 is a diagram describing the respective states of the clutches in a vehicle-stopped electric power generation mode. In FIGS. 2 to 4, the engaged state of the clutch is indicated by shading and power transmission is indicated by a thick arrow.

The operation mode of the hybrid vehicle 1 includes at least: a drive traveling mode for forward traveling: a reverse traveling mode for reverse traveling: a vehicle-stopped mode in which no electric power generation is performed; and a vehicle-stopped electric power generation mode in which electric power generation is performed while a vehicle is stopped. Here, stopping of a vehicle refers not to temporal stopping of the vehicle or a stopping of the vehicle at a traffic light, but to continuous stopping of the vehicle, and may also be referred to as parking of the vehicle (parking).

The operation mode of the hybrid vehicle 1 transitions to the drive traveling mode by the drive range being selected at the shift operation unit 32. The operation mode of the hybrid vehicle 1 transitions to the reverse traveling mode by the reverse range being selected at the shift operation unit 32. In addition, the operation mode transitions to the vehicle-stopped mode or the vehicle-stopped electric power generation mode by the stop range being selected at the shift operation unit 32.

The drive traveling mode includes a drive traveling mode in which only power of the electric motor 6 is used and a drive traveling mode in which the power of the engine 4 is used.

In the drive traveling mode in which the power of the engine 4 is used, the forward clutch C1 is controlled to be in the engaged state, the reverse clutch C2 is controlled to be in the disengaged state, and the output clutch C3 is controlled to be in the engaged state. In this mode, the latch-up clutch C0 may be controlled to be subjected to switching between the engaged state and the disengaged state in accordance with the vehicle state. Due to the respective states of the clutches described above, the power of the engine 4 is transmitted to the driving wheels 2 via the torque converter 12, the forward clutch C1, the transmission 8, the gear mechanism 14*a*, the output clutch C3, and the gear mechanism 14*b*, which allows for forward traveling of the hybrid vehicle 1.

A rotational shaft of the electric motor 6 is coupled to an input shaft of the transmission 8. Accordingly, in the drive traveling mode in which the power of the engine 4 is used, the rotational shaft of the electric motor 6 also rotates. In the drive traveling mode, subjecting the electric motor 6 to a zero-torque operation reduces the load of the electric motor 6. In addition, subjecting the electric motor 6 to a power-running operation makes it possible to increase torque of the driving wheels 2 by output torque of the electric motor 6. In addition, subjecting the electric motor 6 to a regenerative operation causes the power of the engine 4 to be partially sent to the electric motor 6, allowing for electric power generation.

In the drive traveling mode in which only the power of the electric motor 6 is used, the forward clutch C1 is controlled to be in the disengaged state, the reverse clutch C2 is controlled to be in the disengaged state, and the output clutch C3 is controlled to be in the engaged state. Such respective states of the clutches causes the power of the electric motor 6 to be transmitted to the driving wheels 2 via the transmission 8, the gear mechanism 14*a*, the output clutch C3, and the gear mechanism 14*b*, which allows for the forward traveling of the hybrid vehicle 1. In addition, both the forward clutch C1 and the reverse clutch C2 being in the disengaged state cuts off the power transmission path between the electric motor 6 and the engine 4, which makes it possible to stop the engine 4 while the hybrid vehicle 1 is traveling.

The reverse traveling mode includes the first reverse traveling mode and the second reverse traveling mode. The first reverse traveling mode is a mode in which the reverse traveling is performed by the power of the engine 4. The second reverse traveling mode is a mode in which the reverse traveling is performed by the power of the electric motor 6.

As illustrated in FIG. 2, in the first reverse traveling mode, the forward clutch C1 is controlled to be in the disengaged state, the reverse clutch C2 is controlled to be in the engaged state, and the output clutch C3 is controlled to be in the engaged state. In this mode, the latch-up clutch C0 may be controlled to be in the disengaged state. Such switching related to the clutches causes the power of the engine 4 to be reversed in rotation direction by the reverse gear mechanism 10. In addition, such power is sent to the driving wheels 2 via the transmission 8, the gear mechanism 14*a*, the output clutch C3, and the gear mechanism 14*b*, which allows for the reverse traveling of the hybrid vehicle 1.

In the second reverse traveling mode, the forward clutch C1 is controlled to be in the disengaged state, the reverse clutch C2 is controlled to be in the disengaged state, and the output clutch C3 is controlled to be in the engaged state, as illustrated in FIG. 3. Such switching related to the clutches subjects the electric motor 6 to a power-running operation in reverse rotation. This causes the power in the reverse rotation to be transmitted to the driving wheels 2 via the transmission 8, the gear mechanism 14*a*, the output clutch C3, and the gear mechanism 14*b*, which allows for the reverse traveling of the hybrid vehicle 1. Both the forward clutch C1 and the reverse clutch C2 being in the disengaged state cuts off the power transmission path between the electric motor 6 and the engine 4, which helps to prevent the driving of the electric motor 6 from being hindered by the engine 4.

In the vehicle-stopped mode in which no electric power generation is performed, the forward clutch C1 is controlled to be in the disengaged state and the reverse clutch C2 is controlled to be in the disengaged state. In this mode, the output clutch C3 may be controlled to be in the disengaged state, or may be controlled to be in the engaged state. In addition, in this mode, an unillustrated parking lock mechanism may so operate as to stop the rotation of the driving wheels 2. In this mode, the power of the engine 4 is not transmitted to the driving wheels 2 even if the engine 4 is operating. In addition, the electric motor 6 is stopped.

In the vehicle-stopped electric power generation mode in which electric power generation is performed while the vehicle is stopped, the forward clutch C1 is controlled to be in the engaged state, the reverse clutch C2 is controlled to be in the disengaged state, and the output clutch C3 is controlled to be in the disengaged state, as illustrated in FIG. 4. In this mode, the latch-up clutch C0 may be controlled to be in the engaged state. In addition, in this mode, the unillustrated parking lock mechanism may so operate as to stop the rotation of the driving wheels 2. In this mode, the engine 4 is driven and the electric motor 6 is subjected to the regenerative operation. The above-described control causes the power of the engine 4 to be sent to the electric motor 6 via the forward clutch C1. Meanwhile, the power of the engine 4 is not outputted to the driving wheels 2. This allows for stopping of the hybrid vehicle 1 and electric power generation by the electric motor 6.

<Mode Switching Process to be Performed by Control Apparatus>

FIG. 5 is a flowchart illustrating a mode switching process to be executed by the controller. The mode switching process is to be constantly and repeatedly executed while a system of the hybrid vehicle 1 is operating.

Upon starting of the mode switching process, the controller 21 acquires an operation state of the operation unit 33 and an operation state of the shift operation unit 32 (step S1). Further, the controller 21 acquires information indicating the vehicle state such as the vehicle speed or the charged state of the battery 17 (step S2). The operation performed on the operation unit 33 and the operation performed on the shift operation unit 32 may each be an operation performed by a driver, or may each be an operation performed by a control of an automatic driving system.

Thereafter, on the basis of a signal of the shift operation unit 32 out of the operation information acquired in step S1, the controller 21 determines whether switching of the shift range has been performed (step S3). If the switching has not been performed as a result, the controller 21 returns the process to step S1, and repeats the processes from step S1.

In contrast, if the switching of the shift range has been performed, the controller 21 determines the selected shift range (step S4). If the selected shift range is the drive range, the controller 21 executes a process of switching to the drive traveling mode (step S5). The process in step S5 includes a process of controlling the respective states of the clutches (C0 to C3) by driving the control valve 18b.

Upon performing the switching to the drive traveling mode in step S5, the controller 21 may select, on the basis of the vehicle state, either of the drive traveling mode in which only the power of the electric motor 6 is used or the drive traveling mode in which the power of the engine 4 is used. In addition, after transition to the drive traveling mode, the controller 21 may perform, on the basis of the vehicle state, switching between the drive traveling mode in which only the power of the electric motor 6 is used and the drive traveling mode in which the power of the engine 4 is used. In addition, after transition to the drive traveling mode in which the power of the engine 4 is used, the controller 21 may switch the operation of the electric motor 6 between the zero torque operation, the power-running operation, and the regenerative operation on the basis of the vehicle state.

If the selected range is the stop range as a result of the determination performed in step S4, the controller 21 determines whether an electric power generation condition during stopping of a vehicle is satisfied on the basis of the pieces of information acquired in steps S1 and S2 (step S6). The electric power generation condition may include, for example, a condition related to the operation state of the operation unit 33 and a condition related to the charged state of the battery 17. For example, in step S6, if the operation unit 33 is in the operation state indicating that the electric power generation is requested and if the charged state is less than or equal to a threshold, the controller 21 may determine that the electric power generation condition during stopping of the vehicle is satisfied.

If the result of the determination performed in step S6 is YES, the controller 21 executes a process of switching to the vehicle-stopped electric power generation mode (step S7). If the result of the determination performed in step S6 is NO, the controller 21 executes a process of switching to the vehicle-stopped mode in which no electric power generation is performed (step S8). The respective processes in steps S7 and S8 each include a process of controlling the respective states of the clutches (C0 to C3) by driving the control valve 18b.

Note that the process of switching to the vehicle-stopped electric power generation mode performed in step S7 is not necessarily executed on the basis of the switching of the shift range. For example, the controller 21 may execute the process of switching to the vehicle-stopped electric power generation mode in a case where the electric power generation condition is satisfied without the switching of the shift range in the vehicle-stopped mode in which no electric power generation is performed.

If the selected range is the reverse range as a result of the determination performed in step S4, the controller 21 determines whether the state of the hybrid vehicle 1 selected at the current timing is the vehicle-stopped electric power generation mode (step S9). The vehicle-stopped electric power generation mode to be determined here may be a state in which the engine 4 is actually driven and the electric motor 6 is performing electric power generation, or may be a state in which the driving of the engine 4 and the electric power generation by the electric motor 6 are both stopped (for example, they are stopped due to completion of charging). The vehicle-stopped electric power generation mode to be determined in step S9 refers to that the respective states of the clutches (C0 to C3) are in the states in the vehicle-stopped electric power generation mode.

If the result of the determination performed in step S9 is YES, the controller 21 executes a process of switching to the second reverse traveling mode (step S10). In contrast, if the result of the determination performed in step S9 is NO, the controller 21 executes a process of switching to the first reverse traveling mode (step S11). The respective processes in steps S10 and S11 each include a process of controlling the respective states of the clutches (C0 to C3) by driving the control valve 18b.

If the state of the hybrid vehicle 1 at the current timing is the vehicle-stopped electric power generation mode in the determination process performed in step S9, the controller 21 causes the process to branch to step S10 whether the engine 4 is being driven or being stopped. In other words, the controller 21 selects switching to the second reverse traveling mode in which the reverse traveling is performed by the power of the electric motor 6, even if the engine 4 is being driven.

If the state of the hybrid vehicle 1 at the current timing is the vehicle-stopped electric power generation mode in the determination process performed in step S9, the controller 21 may cause the process to branch to step S10 without performing a process of checking the charged state of the battery 17. It is estimated that the charged state of the battery 17 is restored because the state immediately before has been the vehicle-stopped electric power generation mode. In addition, the reverse traveling often ends within a relatively short distance. Therefore, even in a case where the process proceeds to steps S9 and S10 without checking the charged state of the battery 17, the possibility that the driving of the electric motor 6 is to be inhibited due to a low charged state of the battery 17 is low. This makes it possible to continue favorable traveling of the hybrid vehicle 1.

After the respective processes in steps S5, S7, S8, S10, and S11, the controller 21 returns the process to step S1.

Note that the determination condition in step S9 is not limited to the example described above. This determination condition may include an exceptional condition. The exceptional condition is, for example, a condition for which the process branches to step S11 on the basis of, for example, various vehicle states, an outside environment condition, and setting configured by the driver, even if the state immediately before is the vehicle-stopped electric power generation mode. In this case also, the second reverse traveling mode is selected upon switching from the vehicle-stopped electric power generation mode to the reverse traveling in a case other than a case where the above-described exceptional condition is satisfied. This makes it possible to obtain effects to be described later by making such a selection. In addition, the determination condition in step S9 is not limited to the example described above, and may include another condition for which the process branches to step S10 on the basis of, for example, various vehicle states, the outside environment condition, and the setting configured by the driver, even if the state immediately before is not the vehicle-stopped electric power generation mode. Thus, the operation mode in which the reverse traveling is performed by the power of the electric motor 6 may be selected in accordance with various conditions in a case where switching is performed from the operation mode of the state immediately before other than the vehicle-stopped electric power generation mode to the reverse traveling.

A program for the above-described process of mode switching is stored in a non-transitory computer readable medium such as the storage device 22 included in the controller 21. The controller 21 may be configured to read the program stored in a portable non-transitory computer readable medium and execute the program. The above-described portable non-transitory computer readable medium may hold the above-described program for the process of mode switching.

<Details of Switching to Reverse Traveling Mode>

Upon performing switching from the vehicle-stopped electric power generation mode to the reverse traveling mode by steps S9 and S10 in FIG. 5, the controller 21 automatically selects, as a mode to select, the second reverse traveling mode in which the reverse traveling is performed by the power of the electric motor 6.

In the switching to the second reverse traveling mode, the clutch to be subjected to switching from the disengaged state to the engaged state is the output clutch C3, and the clutches to be subjected to switching from the engaged state to the disengaged state are the two clutches which are the latch-up clutch C0 and the forward clutch C1. As described above, the controller 21 is able to swiftly subject the clutches to the switching from the engaged state to the disengaged state. In addition, in a case where the controller 21 subjects the clutches to the switching from the disengaged state to the engaged state, it takes a switching time for one time for each of the clutches. Because the clutch to be subjected to the switching from the disengaged state to the engaged state in the above-described switching is the output clutch C3, the controller 21 is able to swiftly perform switching from the vehicle-stopped electric power generation mode to the second reverse traveling mode. This makes it possible for the hybrid vehicle 1 to swiftly transition from the stopped state to the reverse traveling.

A description is given of a hypothetical case in which the controller 21 performs switching from the vehicle-stopped electric power generation mode to the first reverse traveling mode. In this switching, the clutches to be subjected to the switching from the disengaged state to the engaged state are the two clutches which are the reverse clutch C2 and the output clutch C3, and the clutches to be subjected to the switching from the engaged state to the disengaged state are the two clutches which are the latch-up clutch C0 and the forward clutch C1. As described above, the controller 21 is able to swiftly subject the clutches to the switching from the engaged state to the disengaged state. However, in a case where the controller 21 subjects the two clutches (C2 and C3) to the switching from the disengaged state to the engaged state, the controller 21 executes the switching processes in order. Therefore, it takes switching times for two times. Accordingly, it takes longer time in the switching from the vehicle-stopped electric power generation mode to the first reverse traveling mode than in the switching to the second reverse traveling mode. In this case, the driver feels clumsiness in transition from the vehicle-stopped state to the reverse traveling as a result.

As described above, according to the hybrid vehicle 1 and the control apparatus 20 of Embodiment 1, the controller 21 switches the operation mode to the second reverse traveling mode in a case where the switching from the stopped-vehicle electric power generation mode to the reverse traveling is requested. It is possible to perform the switching from the stopped-vehicle electric power generation mode to the second reverse traveling mode more swiftly than the switching to the first reverse traveling mode. Accordingly, the hybrid vehicle 1 is able to swiftly transition to the reverse traveling.

Further, according to the hybrid vehicle 1 and the control apparatus 20 of Embodiment 1, upon performing the switching from the stopped-vehicle electric power generation mode to the second reverse traveling mode, the controller 21 performs the switching to the second reverse traveling mode even if the engine 4 is being driven. Accordingly, it is possible to allow for swift transition to the reverse traveling even if the engine 4 is being driven. Typically, the reverse traveling does not continue for a long time. Therefore, even if the engine 4 is being driven, an influence on fuel economy is very small.

Further, according to the hybrid vehicle 1 and the control apparatus 20 of Embodiment 1, the controller 21 controls the forward clutch C1 to be in the engaged state, controls the reverse clutch C2 to be in the disengaged state, and controls the output clutch C3 to be in the disengaged state in the vehicle-stopped electric power generation mode. In addition, the controller 21 controls the forward clutch C1 to be in the disengaged state, controls the reverse clutch C2 to be in the engaged state, and controls the output clutch C3 to be in the engaged state in the first reverse traveling mode. In addition, the controller 21 controls the forward clutch C1 to be in the disengaged state, controls the reverse clutch C2 to be in the disengaged state, and controls the output clutch C3 to be in the engaged state in the second reverse traveling mode. Further, in a case of performing the switching from the vehicle-stopped electric power generation mode to the reverse traveling, the controller 21 automatically selects the second reverse traveling mode in which the clutch to be subjected to the switching from the disengaged state to the engaged state is only one. It is therefore possible to achieve swift switching from the vehicle-stopped electric power generation mode to the reverse traveling without increasing the number or the performance of the clutch switching device 18, in other words, without increasing the number of clutches to be subjected to the switching from the disengaged state to the engaged state at a time. This makes it possible to reduce the size of the clutch switching device 18.

Further, according to the hybrid vehicle 1 and the control apparatus 20 of Embodiment 1, the clutch switching device 18 is configured to perform the switching related to the clutches with use of the hydraulic pressure. In the configuration where the switching related to the clutches is performed with use of the hydraulic pressure, increasing the performance of the clutch switching device 18 leads to a great change from the previous configuration, which increases the development cost of the hybrid vehicle 1. For such a reason, achieving the swift switching from the vehicle-stopped electric power generation mode to the reverse traveling without increasing the number or the performance of the clutch switching device 18 is markedly useful in adopting the clutch switching device 18 that uses the hydraulic pressure.

Further, according to the hybrid vehicle 1 and the control apparatus 20 of Embodiment 1, in a case where switching from the operation mode other than the vehicle-stopped electric power generation mode to the reverse traveling is requested, the controller 21 is configured to switch the operation mode to the first reverse traveling mode. For example, due to the vehicle state, other various environment conditions, and a request from the driver, a situation in which the use of the power of the engine 4 is preferable may occur. In such a situation, it is possible to achieve the reverse traveling corresponding to the situation by selecting the first reverse traveling mode in a case where the switching to the reverse traveling is possible within a relatively short time.

Embodiment 2

FIG. 6 is a block diagram illustrating a hybrid vehicle and a control apparatus according to Embodiment 2 of the invention. Embodiment 2 differs from Embodiment 1 in a portion of a power transmission mechanism of a hybrid vehicle 1A and in the respective states of the clutches in each of the operation modes, and are similar to Embodiment 1 in other points. Configurations that are the same as those in Embodiment 1 are denoted with the same reference numerals, and detailed descriptions thereof are omitted.

The hybrid vehicle 1A of Embodiment 2 includes, in addition to the power transmission mechanism of Embodiment 1, a direct gear mechanism 15 and a second output clutch C5. The direct gear mechanism 15 is configured to transmit the power of the engine 4 or the electric motor 6 to the driving wheels 2 without using the transmission 8. The second output clutch C5 couples the direct gear mechanism 15 to a power transmission path on the power side. The second output clutch C5 may be positioned at an output shaft of the reverse gear mechanism 10, that is, the input shaft of the transmission 8. The second output clutch C5 may couple or decouple the output shaft of the reverse gear mechanism 10, that is, the input shaft of the transmission 8, to the direct gear mechanism 15. In Embodiment 2, a clutch that couples the output shaft of the transmission 8 and a propeller shaft of the driving wheels 2 is referred to as a first output clutch C3.

The hybrid vehicle 1A of Embodiment 2 further includes two driving wheels 2A and a transfer clutch C6. The transfer clutch C6 transmits power to a propeller shaft of the driving wheels 2A.

The controller 21 is able to switch the respective states of the clutches (C0 to C3, C5, and C6) by controlling the control valve 18b of the clutch switching device 18. In FIG. 6, the hydraulic pressure sent from the control valve 18b is indicated by an arrow of a dash-dot-dash line.

In Embodiment 2, the first output clutch C3 or the second output clutch C5 corresponds to an example of an output clutch according to the invention. In Embodiment 2 also, the forward clutch C1 and the reverse clutch C2 serve as the clutches that are able to cut off the power transmission path between the engine 4 and the electric motor 6. That is, both the forward clutch C1 and the reverse clutch C2 being in the disengaged state cuts off the power transmission path between the engine 4 and the electric motor 6.

<Operation Modes and States of Clutches>

As with Embodiment 1, the operation modes of the hybrid vehicle 1A includes the drive traveling mode, the first traveling mode in which the power of the engine 4 is used, the second reverse traveling mode in which the power of the electric motor 6 is used, the vehicle-stopped mode, and the vehicle-stopped electric power generation mode. Conditions for switching to the respective operation modes are similar to those in Embodiment 1.

In the following, a description is given of a case where power is transmitted to the driving wheels 2 via the direct gear mechanism 15. However, the power may be transmitted to the driving wheels 2 via the transmission 8. In a case where the power is transmitted via the transmission 8, the second output clutch C5 is controlled to be in the disengaged state, and other points are similar to those in Embodiment 1. Whether to transmit the power via the direct gear mechanism 15 or to transmit the power via the transmission 8 may be selected in accordance with a selection operation performed by the driver or the vehicle state.

The drive traveling mode includes a drive traveling mode in which only the power of the electric motor 6 is used and a drive traveling mode in which the power of the engine 4 is used.

In the drive traveling mode in which the power of the engine 4 is used, the forward clutch C1 is controlled to be in the engaged state, the reverse clutch C2 is controlled to be in the disengaged state, the first output clutch C3 is controlled to be in the disengaged state, and the second output clutch C5 is controlled to be in the engaged state. In this mode, the latch-up clutch C0 may be controlled to be subjected to switching between the engaged state and the disengaged state in accordance with the vehicle state. Due to the respective states of the clutches described above, the power of the engine 4 is transmitted to the driving wheels 2 via the torque converter 12, the forward clutch C1, the second output clutch C5, the direct gear mechanism 15, and the gear mechanisms 14a and 14b, which allows for forward traveling of the hybrid vehicle 1.

In the drive traveling mode in which only the power of the electric motor 6 is used, the forward clutch C1 is controlled to be in the disengaged state, the reverse clutch C2 is controlled to be in the disengaged state, the first output clutch C3 is controlled to be in the disengaged state, and the second output clutch C5 is controlled to be in the engaged state. Such respective states of the clutches cause the power of the electric motor 6 to be transmitted to the driving wheels 2 via the second output clutch C5, the direct gear mechanism 15, and the gear mechanisms 14a and 14b, which allows for the forward traveling of the hybrid vehicle 1A. In addition, both the forward clutch C1 and the reverse clutch C2 being in the disengaged state cuts off the power transmission path between the electric motor 6 and the engine 4, which makes it possible to stop the engine 4 while the vehicle is traveling.

In the first reverse traveling mode, the forward clutch C1 is controlled to be in the disengaged state, the reverse clutch C2 is controlled to be in the engaged state, the first output clutch C3 is controlled to be in the disengaged state, and the second output clutch C5 is controlled to be in the engaged state. In this mode, the latch-up clutch C0 may be controlled to be in the disengaged state. Such switching related to the clutches causes the power of the engine 4 to be reversed in the rotation direction by the reverse gear mechanism 10. In addition, such power is sent to the driving wheels 2 via the second output clutch C5, the direct gear mechanism 15, and the gear mechanisms 14a and 14b, which allows for reverse traveling of the hybrid vehicle 1A.

In the second reverse traveling mode, the forward clutch C1 is controlled to be in the disengaged state, the reverse clutch C2 is controlled to be in the disengaged state, the first output clutch C3 is controlled to be in the disengaged state, and the second output clutch C5 is controlled to be in the engaged state. Such switching related to the clutches subjects the electric motor 6 to the power-running operation in reverse rotation. This causes the power in the reverse rotation to be transmitted to the driving wheels 2 via the second output clutch C5, the direct gear mechanism 15, and the gear mechanism 14a and 14b, which allows for the reverse traveling of the hybrid vehicle 1A. Both the forward clutch C1 and the reverse clutch C2 being in the disengaged state cuts off the power transmission path between the electric motor 6 and the engine 4, which helps to prevent the driving of the electric motor 6 from being hindered by the engine 4.

In the vehicle-stopped mode in which no electric power generation is performed, the forward clutch C1 is controlled to be in the disengaged state, the reverse clutch C2 is controlled to be in the disengaged state, the first output clutch C3 is controlled to be in the disengaged state, and the second output clutch C5 is controlled to be in the engaged state. In this mode, the first output clutch C3 may be controlled to be in the disengaged state, and the second output clutch C5 may be controlled to be in the disengaged state. In addition, in this mode, an unillustrated parking lock mechanism may so operate as to stop the rotation of the driving wheels 2. In this mode, the power of the engine 4 is not transmitted to the driving wheels 2 even if the engine 4 is operating. In addition, the electric motor 6 is stopped.

In the vehicle-stopped electric power generation mode in which electric power generation is performed while the hybrid vehicle 1 is stopped, the forward clutch C1 is controlled to be in the engaged state, the reverse clutch C2 is controlled to be in the disengaged state, the first output clutch C3 is controlled to be in the disengaged state, and the second output clutch C5 is controlled to be in the disengaged state. In this mode, the latch-up clutch C0 may be controlled to be in the engaged state. In addition, in this mode, the unillustrated parking lock mechanism may so operate as to stop the rotation of the driving wheels 2. In this mode, the engine 4 is driven, and the electric motor 6 is subjected to the regenerative operation. The above-described control causes the power of the engine 4 to be sent to the electric motor 6 via the forward clutch C1. Meanwhile, the power of the engine 4 is not outputted to the driving wheels 2. This allows for stopping of the hybrid vehicle 1 and electric power generation by the electric motor 6.

Depending on the selection operation performed by the driver or the vehicle state, the transfer clutch C6 is controlled to be in the engaged state if four-wheel-driving is selected, and is controlled to be in the disengaged state if two-wheel-driving is selected.

<Mode Switching Process>

The controller 21 of the control apparatus 20 executes the process of switching the operation mode in a manner similar to that of Embodiment 1. In addition, as with Embodiment 1, upon performing the switching from the vehicle-stopped electric power generation mode to the reverse traveling, the controller 21 automatically selects the switching to the second reverse traveling mode.

If the switching is performed from the vehicle-stopped electric power generation mode to the first reverse traveling mode, the clutches to be subjected to the switching from the disengaged state to the engaged state are two clutches which are the reverse clutch C2 and the second output clutch C5. Accordingly, the time for switching includes two times of the time for switching related to a clutch.

Meanwhile, the clutches to be subjected to the switching from the disengaged state to the engaged state by the switching from the vehicle-stopped electric power generation mode to the second reverse traveling mode is one clutch which is the second output clutch C5. Accordingly, the time for switching is shortened, which allows the hybrid vehicle 1A to swiftly transition to the reverse traveling.

Effects similar to those in Embodiment 1 are achievable also by the hybrid vehicle 1A and the control apparatus 20 of Embodiment 2.

Although some embodiments of the invention have been described in the foregoing, the invention is not limited to the embodiments described above. For example, the gear configuration and the clutch configuration described in the embodiments are modifiable in arrangement to some patterns without changing the functions thereof. In addition, details described in the embodiments are appropriately modifiable within the scope of the invention.

DESCRIPTION OF REFERENCE NUMERALS 1, 1A Hybrid vehicle
2, 2A Driving wheel
3 Accessories
4 Engine
6 Electric motor
8 Transmission
10 Reverse gear mechanism
12 Torque converter
C0 Latch-up clutch
C1 Forward clutch
C2 Reverse clutch
C3 Output clutch (First output clutch)
C5 Second output clutch
C6 Transfer clutch
14a, 14b Gear mechanism
15 Direct gear mechanism
16 Inverter
17 Battery
18 Clutch switching device
18a Hydraulic pressure pump
18b Control valve
20 Control apparatus
21 Controller
22 Storage device
31 Driving operation unit
32 Shift operation unit
33 Operation unit

The invention claimed is:

1. A hybrid vehicle control apparatus that is a control apparatus to be mounted on a hybrid vehicle, the hybrid vehicle comprising a driving wheel, an engine, an electric motor, a transmission, and a clutch, the engine being an internal combustion engine, the electric motor generating power to be outputted to the driving wheel, the transmission being positioned on a power transmission path between the electric motor and the driving wheel, the clutch being configured to cut off the power transmission path between the engine and the electric motor, the hybrid vehicle control apparatus comprising a controller configured to switch an operation mode of the hybrid vehicle between a vehicle-stopped electric power generation mode, a first reverse traveling mode, and a second reverse traveling mode, the vehicle-stopped electric power generation mode being a mode in which electric power generation is performed, while the hybrid vehicle is stopped, by sending power of the engine to the electric motor, the first reverse traveling mode being a mode in which reverse traveling is performed by the power of the engine, the second reverse traveling mode being a mode in which the reverse traveling is performed by power of the electric motor, wherein the controller is configured to switch the operation mode to the second reverse traveling mode when switching from the vehicle-stopped electric power generation mode to the reverse traveling is requested.

2. The hybrid vehicle control apparatus according to claim 1, wherein the controller is configured to switch the operation mode to the second reverse traveling mode even if the engine is being driven when the switching from the vehicle-stopped electric power generation mode to the reverse traveling is requested.

3. The hybrid vehicle control apparatus according to claim 2, wherein the hybrid vehicle comprises a forward clutch, a reverse clutch, an output clutch, and a clutch switching device, the forward clutch being configured to transmit the power of the engine in forward rotation as it is, the reverse clutch being configured to transmit the power of the engine via a reverse gear mechanism, the output clutch being configured to transmit, to the driving wheel, the power transmitted via the forward clutch or the reverse clutch, the clutch switching device being configured to switch respective states of the forward clutch, the reverse clutch, and the output clutch, wherein the controller is configured to, in the vehicle-stopped electric power generation mode, control the forward clutch to be in an engaged state, control the reverse clutch to be in a disengaged state, and control the output clutch to be in a disengaged state, wherein the controller is configured to, in the first reverse traveling mode, control the forward clutch to be in a disengaged state, control the reverse clutch to be in an engaged state, and control the output clutch to be in an engaged state, and wherein the controller is configured to, in the second reverse traveling mode, control the forward clutch to be in the disengaged state, control the reverse clutch to be in the disengaged state, and control the output clutch to be in the engaged state.

4. The hybrid vehicle control apparatus according to claim 3, wherein the clutch switching device is configured to perform switching between the engaged state and the disengaged state of each of the forward clutch, the reverse clutch, and the output clutch with use of hydraulic pressure.

5. The hybrid vehicle control apparatus according to claim 4, wherein the controller is configured to switch the operation mode to the first reverse traveling mode when switching from the operation mode other than the vehicle-stopped electric power generation mode to the reverse traveling is requested.

6. The hybrid vehicle control apparatus according to claim 3, wherein the controller is configured to switch the operation mode to the first reverse traveling mode when switching from the operation mode other than the vehicle-stopped electric power generation mode to the reverse traveling is requested.

7. The hybrid vehicle control apparatus according to claim 2, wherein the controller is configured to switch the operation mode to the first reverse traveling mode when switching from the operation mode other than the vehicle-stopped electric power generation mode to the reverse traveling is requested.

8. The hybrid vehicle control apparatus according to claim 1, wherein, the hybrid vehicle comprises a forward clutch, a reverse clutch, an output clutch, and a clutch switching device, the forward clutch being configured to transmit the power of the engine in forward rotation as it is, the reverse clutch being configured to transmit the power of the engine via a reverse gear mechanism, the output clutch being configured to transmit, to the driving wheel, the power transmitted via the forward clutch or the reverse clutch, the clutch switching device being configured to switch respective states of the forward clutch, the reverse clutch, and the output clutch, wherein the controller is configured to, in the vehicle-stopped electric power generation mode, control the forward clutch to be in an engaged state, control the reverse clutch to be in a disengaged state, and control the output clutch to be in a disengaged state, the controller is configured to, in the first reverse traveling mode, control the forward clutch to be in a disengaged state, control the reverse clutch to be in an engaged state, and control the output clutch to be in an engaged state, and the controller is configured to, in the second reverse traveling mode, control the forward clutch to be in the disengaged state, control the reverse clutch to be in the disengaged state, and control the output clutch to be in the engaged state.

9. The hybrid vehicle control apparatus according to claim 8, wherein the clutch switching device is configured to perform switching between the engaged state and the disengaged state of each of the forward clutch, the reverse clutch, and the output clutch with use of hydraulic pressure.

10. The hybrid vehicle control apparatus according to claim 9, wherein the controller is configured to switch the operation mode to the first reverse traveling mode when switching from the operation mode other than the vehicle-stopped electric power generation mode to the reverse traveling is requested.

11. The hybrid vehicle control apparatus according to claim 8, wherein the controller is configured to switch the operation mode to the first reverse traveling mode when switching from the operation mode other than the vehicle-stopped electric power generation mode to the reverse traveling is requested.

12. The hybrid vehicle control apparatus according to claim 1, wherein the controller is configured to switch the operation mode to the first reverse traveling mode when switching from the operation mode other than the vehicle-stopped electric power generation mode to the reverse traveling is requested.

* * * * *